United States Patent [19]

Bell et al.

[11] 3,900,835

[45] Aug. 19, 1975

[54] BRANCHING CIRCUIT FOR MICROPROGRAM CONTROLLED CENTRAL PROCESSOR UNIT

[75] Inventors: C. Gordon Bell, Lincoln; John E. Buzynski, Townsend; Charles H. Kaman, Newton Highlands; James F. O'Loughlin, Westford, all of Mass.

[73] Assignee: Digital Equipment Corporation, Maynard, Mass.

[22] Filed: Sept. 24, 1973

[21] Appl. No.: 400,342

[52] U.S. Cl. .......... 340/172.5

[51] Int. Cl. .......... G06f 9/16

[58] Field of Search .......... 340/172.5

[56] References Cited

UNITED STATES PATENTS

| | | | |
|---|---|---|---|
| 3,517,171 | 6/1970 | Avizienis | 340/172.5 |
| 3,544,777 | 12/1970 | Winkler | 340/172.5 |
| 3,702,988 | 11/1972 | Haney et al. | 340/172.5 |
| 3,775,754 | 11/1973 | Auspurg et al. | 340/172.5 |

*Primary Examiner*—Gareth D. Shaw
*Assistant Examiner*—John P. Vandenburgh
*Attorney, Agent, or Firm*—Cesari and McKenna

[57] ABSTRACT

A central processor unit under the control of microprogram words retrieved from a storage facility in sequence. A control section in each microprogram word contains information used to define data paths while an address portion identifies the location of the next microprogram word in sequence. A buffer register receives each microprogram word, the address passing through a modification circuit. If a first microprogram word sets up branching conditions within the central processor unit, other circuitry establishes an address offset which is applied to a base address contained in the next microprogram word to thereby alter the location of the following microprogram word. Thus, any microprogram word which can produce a branch must be followed with an other microprogram word which does not depend upon the branch conditions, but which contains a base address.

5 Claims, 5 Drawing Figures

FIG. I

MICROPROGRAM WORD MEANING

| MICROWORD BUFFER OUTPUT SIGNALS | VALUE (OCTAL) | TYPICAL VALUES | | TYPICAL MICROPROGRAM WORDS | | | |
|---|---|---|---|---|---|---|---|
| | | VALUE | MEANING | FETCH | STORE | INC PC | REST PC |
| CLK | 0-7 | 3<br>2<br>4 | TURN OFF CLOCK; SHORT DELAY CYCLE<br>SHORT DELAY CYCLE<br>LONG DELAY CYCLE | 3 | 2 | 4 | 2 |
| CIR | 0-1 | 1 | ENABLE INSTRUCTION REGISTER | 0 | 1 | 0 | 0 |
| CB | 0-1 | 1 | ENABLE B REGISTER | 0 | 1 | 0 | 0 |
| CD | 0-1 | 1 | ENABLE DATA REGISTER | 0 | 0 | 1 | 0 |
| CBA | 0-1 | 1 | ENABLE BUS ADDRESS REGISTER | 1 | 0 | 0 | 0 |
| WR | 0-3 | 0<br>1<br>2<br>3 | DISABLE WRITING OPERATION<br>WRITE IN LOW BYTE POSITION ONLY<br>WRITE IN HIGH BYTE POSITION ONLY<br>WRITE IN BOTH BYTE POSITIONS | 0 | 3 | 0 | 3 |
| BUS | 0-7 | 1<br>3<br>7 | PERFORM DATA INPUT OPERATION AND RESTORE<br>PERFORM DATA INPUT OPERATION AND DO NOT RESTORE<br>PERFORM DATA OUPUT OPERATION | 1 | - | - | - |
| ALU | 0-37 | 1<br>11<br>26 | COMBINE A AND B INPUTS IN LOGICAL "OR"<br>ADD A AND B INPUTS<br>COMBINE A AND B INPUTS IN LOGICAL "EXCLUSIVE OR" | - | - | 11 | - |
| SBC | 0-17 | 1<br>2 | SELECT CONSTANT OF "1"<br>SELECT CONSTANT OF "2" | - | - | 2 | - |
| SBM | 0-17 | 0<br>17 | SELECT B REGISTER AS MULTIPLEXER INPUT<br>SELECT CONSTANTS TABLE AS MULTIPLEXER INPUT | - | - | 17 | - |
| SDM | 0-3 | 1<br>2 | SELECT DATA LINES AS MULTIPLEXER INPUT<br>SELECT DATA REGISTER AS MULTIPLEXER INPUT | - | 1 | - | 0 |
| SBA | 0-1 | 1<br>0 | SELECT REGISTER MEMORY UNIT AS MULTIPLEXER INPUT<br>SELECT ARITHMETIC AND LOGIC UNIT AS INPUT | 1 | 0 | 0 | 0 |
| UBF | 0-37 | 37 | SELECT INPUT "37" AS ADDRESS MODIFIER | - | - | 37 | - |
| SRX | 0-17 | 1<br>2<br>10 | BUFFER REGISTER CONTAINS REGISTER ADDRESS<br>BUS ADDRESS REGISTER CONTAINS REGISTER ADDRESS<br>INSTRUCTION REGISTER CONTAINS REGISTER ADDRESS | 1 | 1 | 1 | 1 |
| RIF | 0-17 | 7<br>13 | SELECT THE PROGRAM COUNTER (REGISTER 7)<br>SELECT THE INSTRUCTION REGISTER (REGISTER | 7 | 13 | 7 | 7 |
| UPF' | 0-777 | - | MICROPROGRAM WORD ADDRESS | 001 | 004 | 005 | |

FIG. 4

BRANCHING CIRCUIT FOR MICROPROGRAM CONTROLLED CENTRAL PROCESSOR UNIT

BACKGROUND OF THE INVENTION

This invention relates to data processing systems and more specifically to a central processor unit in which a microprogram controls internal data transfers.

Central processor units respond to machine level instructions. Each machine level instruction has an operation code and may have an operand address. In order to process the instruction, the central processor unit must perform a series of internal data transfers. For example, the contents of a program counter must be applied to a memory bus address register so that a designated instruction can be retrieved. The operation code must pass to an instruction register to be decoded. The contents of the program counter must be incremented to point to a next instruction in sequence. The operands themselves, identified by the operand addresses, must be transferred to the central processing unit for processing. The processing itself requires additional transfers.

There are two popular ways to control these internal data transfers. In one approach, combinational logic circuits control the transfers. The other approach uses microprogram control. This invention relates to central processor units under microprogram control.

In these central processor units, gating circuits control the flow of data. A particular data path is enabled by control signals to selected gating circuits and the actual transfer occurs when a clock pulse energizes the enabled gating circuits. The central processor unit obtains the control signals from microprogram words which have control and address portions. Each bit position in a control portion corresponds, directly or indirectly, to one or more gating circuits. A ONE enables a corresponding gating circuit while a ZERO disables a corresponding gating circuit. Thus, the control section of a microprogram word defines a "machine state" which the central processor assumes during a clock interval.

A sequence of microprogram words thereby defines a sequence of "micro operations" or data transfer paths and the micro operations define the internal operations of the central processor unit. The exact sequence of the microprogram words is established by the address portion in each microprogram word. The address in each word is the address in a storage facility which contains the next microprogram word to be used in sequence.

As apparent, the central processor unit control must be able to alter the addresses based on various internal and external conditions. Otherwise the system would not be able to "branch" or perform any "decision making" function. If addresses can be altered, then the system has another advantage. It is no longer necessary to repeat a given microprogram word. Rather it can be stored in one location with its address portion then being altered depending upon the particular sequence in which the word is retrieved. This reduces the storage requirements for the microprogram.

Basically prior central processor units using microprogram control alter addresses in two ways. In one approach a single clock pulse produces several simultaneous operations. First, the pulse causes the central processor unit to assume a state which a microprogram word in a buffer register has defined. If any conditions exist which require address modification, then the address in the buffer register is modified and the modified address is transferred to the storage facility to retrieve the next microprogram word in sequence. Although this approach is simple to execute, it is relatively slow. With a single clock, the clock pulse rate must be slowed for all microprogram words based on the longest time necessary to modify an address. Once the address is obtained there is another delay during which the address is decoded in the storage facility and the next microprogram word is retrieved.

A second approach significantly reduces these time delays but adds circuit complexity and costs. In this approach a clock produces phased pulses. During a main clock pulse the central processor unit executes the operations defined by the microprogram word in the buffer register. The phased clock pulse is delayed until flags set and other circuitry produces address modification information. When the phased clock pulse does occur, the central processor unit combines the address modification information, if any, and the address in the buffer register to designate the next microprogram word in sequence.

Therefore, it is an object of this invention to provide a central processor unit under the control of a microprogram in which the modification of microprogram word addresses is simplified.

Another object of this invention is to provide a central processor unit under the control of a microprogram in which simple control circuits implement branching with minimal delays.

SUMMARY

In accordance with one aspect of this invention, each microprogram word from a storage facility passes to a microprogram word buffer register, but an address portion which identifies the next microprogram word to be processed passes through an intermediate modification circuit. With each of successive clock pulses, the control function identified by a control portion of the microprogram work in the buffer register is executed. The "next" word in sequence simultaneously moves to the microprogram word buffer register and its address portion enables the storage facility to begin retrieving the "next next" microprogram word in sequence after a short delay. If a microprogram word establishes a branch, the clock pulse which executes that word can not alter the address of the "next" word. Rather an address offset generator produces address modification information for altering the address portion in the "next" word to produce the correct address to the desired "next next" microprogram word.

This imposes a slight constraint in the sequence of microprogram words. A microprogram word which establishes branching conditions must be followed in sequence by a "next" microprogram word which operates independently of the branching conditions and which contains a base address. This "next" microprogram word may perform no function; but, as will become apparent in the following discussion, a transposition of microprogram words can usually be accomplished so that the "next" word does perform a function. When this occurs, no operational delays occur as a result of the branching operation.

This invention is pointed out with particularity in the appended claims. A more thorough understanding of the above and further objects and advantages of this invention may be attained by referring to the following description taken in conjunction with the accompanying drawings.

BRIEF DESCRIPTION OF THE DRAWINGS

FIG. 4 is a table of typical values which are included in a series of microprogram words.

DESCRIPTION OF AN ILLUSTRATIVE EMBODIMENT

Figure 1:
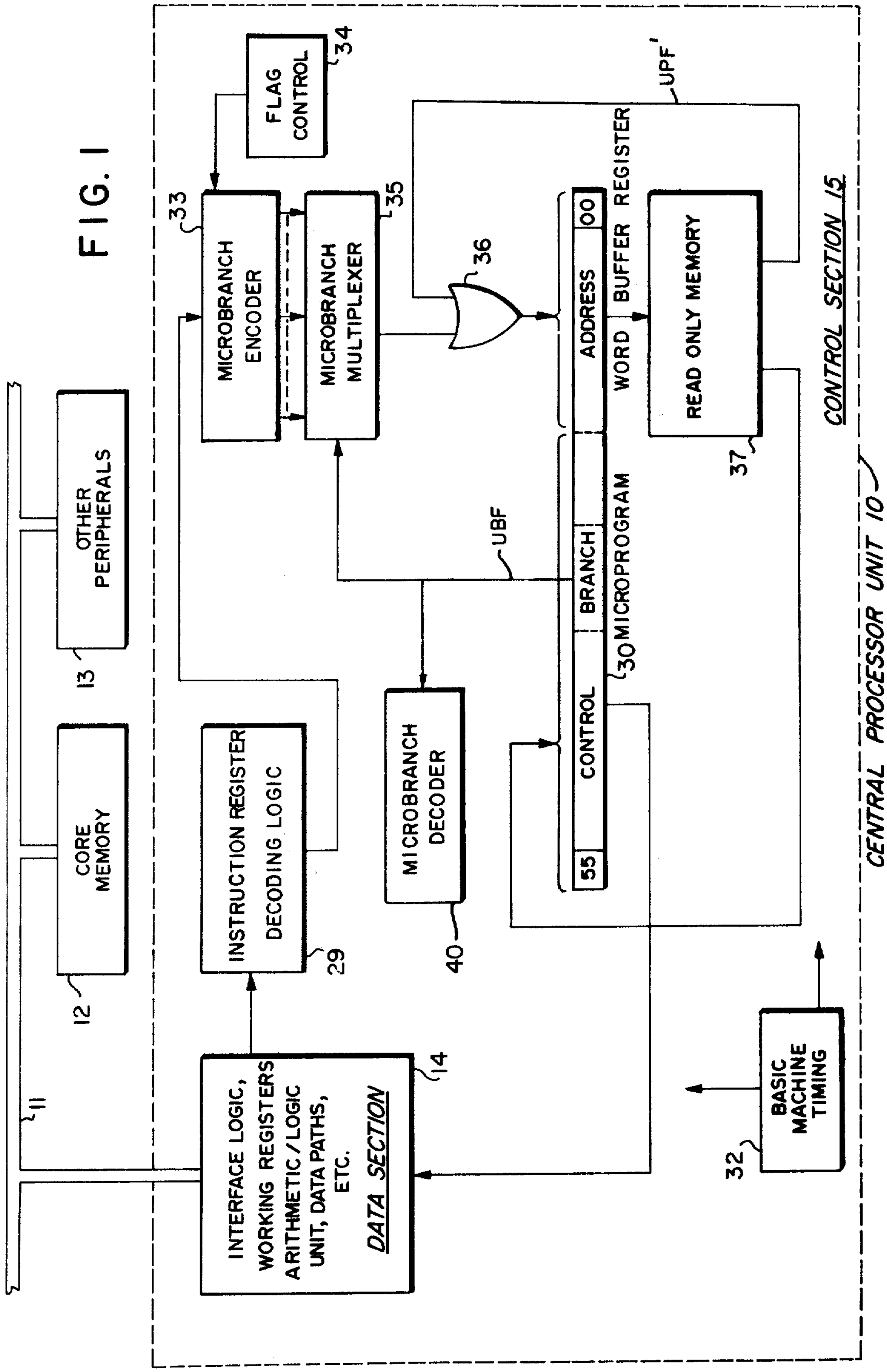
FIG. 1 is a block diagram of a data processing system and a central processor unit for use in such a system.

Referring to FIG. 1, a central processor unit 10 is coupled, by means of a bidirectional bus 11, to a core memory 12, other peripherals 13, and such other equipment as may be incorporated in the system. While the invention itself is applicable to many different types of central processor units, one such unit conveniently serves as a basis for understanding this invention. It is disclosed in U.S. Pat. No. 3,614,741 entitled Data Processing System With Operand Addresses Addressing a Plurality of Registers Including the Program Counter, issued Oct. 19, 1971, and assigned to the same assignee as the present invention.

Figure 2:
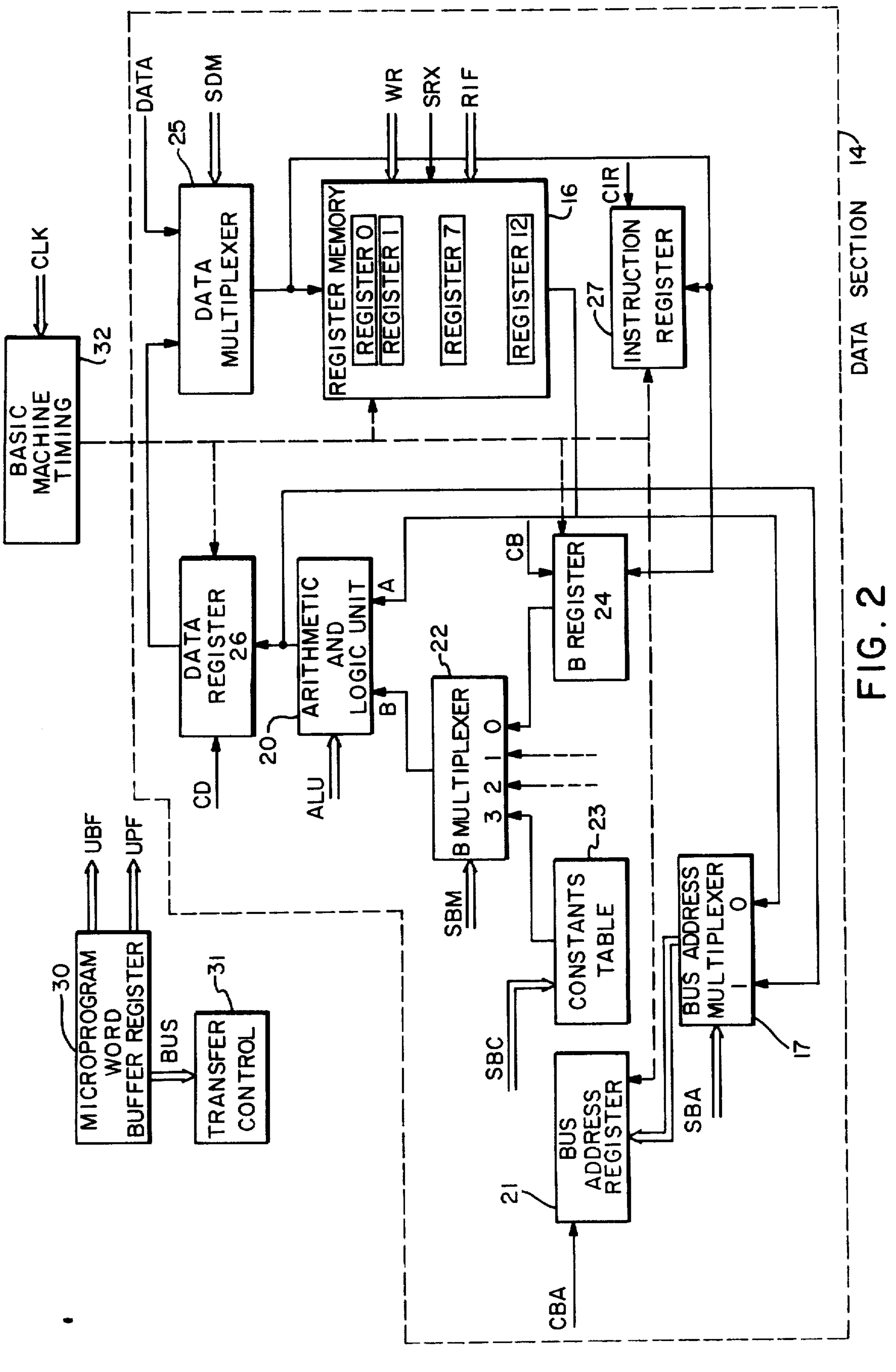
FIG. 2 is a detailed diagram of a data section shown in FIG. 1.

The central processor unit 10 may be considered as comprising a data section 14 and a control section 15. As shown in FIG. 2, and as disclosed in the above-identified patent, the data section 14 includes a register memory unit 16. The register memory unit 16 contains several registers. In this system a machine instruction addresses a register in the unit 16. The addressed register may contain data, an address for a location containing data or a memory address for a location containing a memory address. REGISTER 7 is the program counter. The unit 16 also has additional registers including a REGISTER 12. These additional registers are used internally as scratch pad registers.

Data from a selected register in the unit 16 passes to the inputs of a bus address multiplexer 17 and an arithmetic and logic unit 20. The other input to the bus address multiplexer 17 is the output of the arithmetic and logic unit 20. SBA signals to the bus address multiplexer 17 select one of the two inputs and couple data at the selected input into a bus address register 21 for subsequent transmission onto address lines in the bus 11 (FIG. 1).

Still referring to FIG. 2, the arithmetic and logic unit 20 can perform a number of arithmetic and logical operations on data at A or B inputs. As previously indicated, the A input receives data from the memory register unit 16 while a B multiplexer 22 routes one of several data sources to the B input. SBM signals to the multiplexer 22 control the selection of the input. One input is a constants table 23 which emits a constant selected by SBC signals. Another input is a B register 24.

A data multiplexer 25 provides data to B register 24 and the data multiplexer 25 can, in response to SDM signals, select a data register 26, data lines on the bus 11 (FIG. 1) or other inputs as the data source for the B register 24. The output from the data multiplexer 25 is also an input for the register memory unit 16 and an instruction register 27.

A microprogram word buffer register 30 (FIGS. 1 and 2) receives microprogram words from a read-only memory 37 and provides the various control signals shown in FIG. 2. In addition it provides UBF signals useful in microprogram branching operations and UPF signals for identifying partly a location in the readonly memory unit 37 which contains the next microprogram word to be retrieved. BUS signals are applied to a transfer control circuit 31 to provide signals onto control wires in the bus 11 in FIG. 1 to control whether data transfers over the bus 11 to or from the central processor unit 10.

Referring again to FIG. 2, a basic machine timing circuit 32 produces periodic clock pulses. During intervals between clock pulses (i.e., "ready" intervals) the control signals from the microprogram word buffer 30 enable various data paths within the data section 14. After each ready interval, a clock pulse from the basic machine timing circuit 32 is applied to units in FIG. 2 and, in combination with the control signals from the buffer register 30 which enable a data path, effects a data transfer over that path. The interval during which the transfer occurs is a "transfer" interval.

Figure 3:
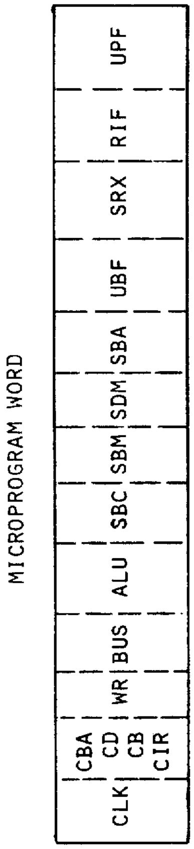
FIG. 3 represents the organization of a typical microprogram word.

Now referring to FIGS. 2 through 4, the basic machine timing circuit 32 receives CLK signals from the microprogram buffer register 30. These signals are based on the contents of CLK bit positions in the microprogram word in the buffer register 30 and they may effectively turn off a system clock, initiate a short delay cycle (i.e., a short ready interval) or a long delay between successive clock pulses or transfer intervals.

Input registers such as the instruction register 27, the B register 24, the data register 26 and the bus address register 21 in FIG. 2 must be enabled in order for a clock pulse from the basic machine timing circuit 32 to transfer data into these respective registers. A different bit position in the buffer register 30 is dedicated to each of these registers. As shown in FIG. 4, if a bit position in the microprogram word, such as the CIR bit position, contains a ONE, the following clock pulse from the machine timing circuit 32 loads data into the respective register, such as the instruction register 27.

WR signals based on the contents of WR bit positions in a microprogram word control the writing operations in the register memory unit 16. For purposes of this discussion, each register in the unit 16 contains two byte positions. The WR signals control whether data at the input to the register memory unit 16 is loaded into one or the other or both byte positions of a selected register or the entire writing operation is disabled.

The arithmetic and logic unit 20 can perform any one of several oprations selected by ALU signals. For example, if the ALU signals based on the contents of corresponding bit positions in the microprogram word have the value $11_8$, the arithmetic and logic unit 20 adds the data at the A and B inputs producing the sum at the input to the data register 26.

As previously stated, one input to the B multiplexer 22 is the constants table 23. SBC signals from the register 30 select a specific constant value. The values 1 and 2 are two examples which are useful in understanding this invention.

The SBM selection signals to the B multiplexer 22 from the register 30 control the selection of one of several input sources and manipulation of bytes. For purposes of this discussion SBM values of 0 and $17_8$ are important. The former selects the entire B register 24; the latter, the full word from the constants table 23.

If the SDM signals based on the contents of SDM bit positions in the microprogram word equal $1_8$, the data multiplexer 25 selects the data lines in the bus 11 (FIG. 1) as an input. A value of $2_8$ causes the data multiplexer 25 to receive signals for data register 26.

In order to identify a specific register in the register memory unit 16, there must be a set of register address signals developed. There are several sources for these signals, such as the instruction register 27 or the bus address register. In addition, a microprogram word may contain a register address. Thus, each microprogram word contains SRX bit positions. Corresponding SRX signals from the buffer register identify the source. For example, a value $2_8$ designates the bus address register; a value $1_8$, the buffer register 30. When the SRX signals designate the buffer register 30, RIF signals constitute the address for the register. Thus, when SRX has the value $1_8$, a value $7_8$ for the RIF signals designates REGISTER 7 (i.e. the program counter); a value $13_8$ selects REGISTER $12_{10}$ which serves as internal instruction register.

The BUS, SBA, UBF and UPF signals from the buffer register 30 have been discussed previously.

The microprogram word buffer register 30 may also produce other signals, but they are not important for an understanding of this invention.

The control section 15 in FIG. 1 includes an instruction register decoding logic circuit 29, a microbranch encoder circuit 33, a flag control circuit 34, a microbranch multiplexer circuit 35, an OR gate array 36, the read-only memory 37, the microprogram word buffer register 30, a microbranch decoder 40, and the basic machine timing unit 32.

In the above-identified U.S. Pat. No. 3,614,741, the central processor unit operates in three machine cycles. During a "fetch" cycle, the program counter produces an address for an instruction. The unit starts to retrieve this instruction and then alters the contents of the program counter so that it contains the next instruction address in sequence. The instruction itself, once received, moves to an instruction register. An operation code in the instruction identifies the sequence of operations to be performed in subsequent cycles. This same fetch cycle is performed by the circuits shown in FIGS. 1 and 2.

The microbranch encoder 33 receives signals from the decoding logic circuit 29 and other sources such as the flag control circuit 34. Conventionally, "flags" comprise flip-flop circuits which assume one of two states, depending on monitored conditions. At times the status of these flip-flops represent internal operating conditions.

At any time, the microbranch encoder 33 may transmit to the microbranch multiplexer 35 address modification information in the form of address offset signals in response to signals from the instruction register decoding logic circuit 29 and the flag control unit 34. The UBF signals from the microprogram word buffer register 30 control the multiplexer 35 so it selects an appropriate number to thereby modify the microprogram address properly.

Specifically, UPF' bits pass from the read-only memory 37, which is the storage facility for the microprogram words, through the OR gate array 36. The microbranch multiplexer 35, under the control of the UBF signals, changes ZEROs to ONEs in any of the address bit positions which pass through the array 36. The remainder of the microprogram word, (i.e., everything but the UPF' bits) passes directly into the microprogram word buffer register 30. If no branching operation is to occur, the UBF bits are at a value (e.g., ZERO) which inhibits the microbranch multiplexer 35 so no modification can occur so the UPF' signals correspond to the UPF signals. A microbranch decoder 40 also receives the UBF signals for use in other aspects of the operation of the central processor unit 10.

A discussion of a particular sequence of events in the central processor unit 10 will facilitate an understanding of this invention. As previously indicated, a microprogram word which contains a non-zero UBF field must be followed by a "next" microprogram word which contains a base address for a branch; and this "next" word must not be related to the branching operation. The specifically disclosed example pertains to the fetch cycle, during which an instruction is retrieved from the memory 12. Four data paths are established in sequence. Referring to FIG. 2, the first data path is established from REGISTER 7 in register memory 16 unit through the bus address multiplexer 17 to the bus address register 21 to begin retrieving an instruction from the memory 12. When the system retrieves the instruction, a second data path transfers it from the bus 11 through the data multiplexer 25 to the instruction register 27, the B register 24 and REGISTER 12. The third data path couples the contents of the program counter (REGISTER 7) to the A input of the arithmetic and logic unit 20 and an increment of "+2" moves to the B input. The sum moves into the data register 26. The fourth data path in sequence is established from the data register 26 through the data multiplexer 25 to REGISTER 7 in the register memory unit 16.

In accordance with this invention, the microprogram word which establishes the third data path between the register memory unit 16 and the data register 26 through the arithmetic and logic unit 20 establishes branching conditions. However, the modification is made to an address contained in the following microprogram word which establishes the fourth data path from the data register 26 to the register memory unit 16 through the data multiplexer 25.

Figure 5:
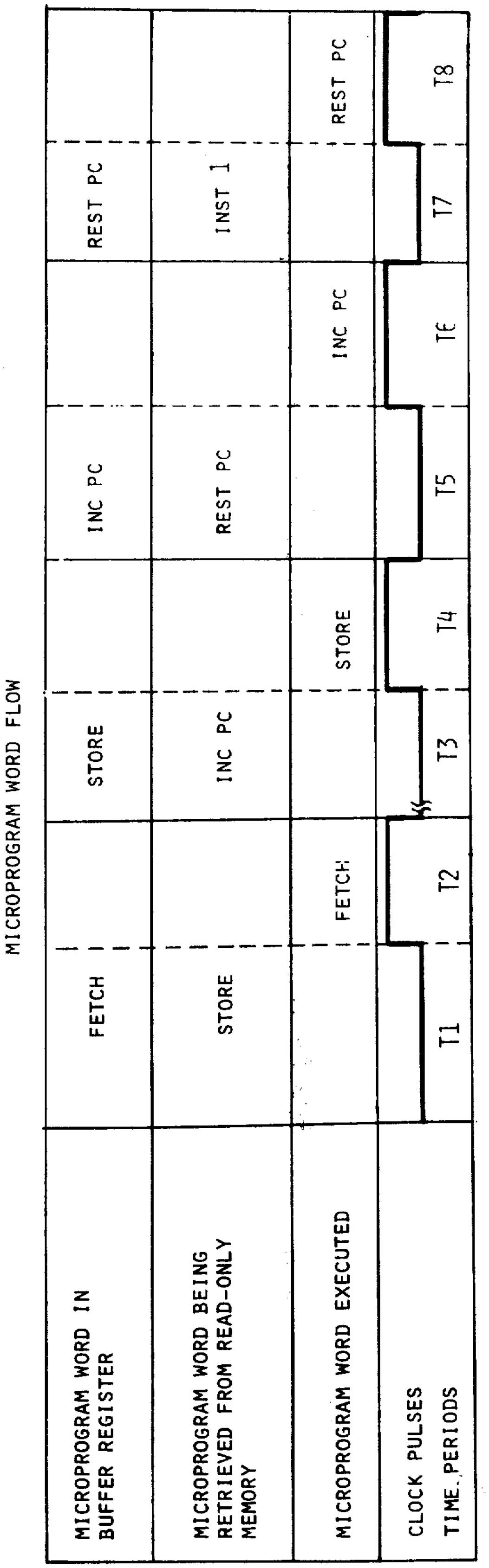
FIG. 5 depicts the flow of microprogram words in FIG. 3 through the control section of the data processing system shown in FIG. 1.

Now referring to FIGS. 4 and 5, FIG. 5 depicts eight time intervals. Intervals *t*1, *t*3, *t*5, and *t*7 represent ready intervals during which the circuitry in FIG. 2 is readied in accordance with the contents of the buffer register 30. Intervals *t*2, *t*4, *t*6, and *t*8, are defined by clock pulses from the unit 32 and correspond to transfer intervals during which data paths are actually established and the data transfers occur.

Assuming that during the interval *t*1, the microprogram word buffer register 30 contains a FETCH microprogram word, the UPF signals have the value 001, which is the address for a STORE microprogram word. Thus, the read-only memory unit 37 is, during period *t*1, retrieving the STORE microprogram word. No transfer is yet occuring. When the basic machine timing circuit 32 issues a clock pulse at *t*2, the circuitry actually establishes a data path from REGISTER 7 to the bus address register 21 because the SRX signals identify the buffer register 30 as the source of the register memory unit 16 address and the RIF signals identify the program counter as the specific register. The SBA signals select the register memory unit 16 as the input to the bus address multiplexer 17 and the CBA signal enables the $t2$ pulse from the unit 32 to load data into the bus address register 21. Thus the $t2$ pulse defines a transfer interval during which the number in REGISTER moves onto the address lines in the bus 11. The CLK signals turn off the clock until the data input operation over the bus 11 terminates and, in this case, the instruction is then present at the input to the data multitplexer 25; then a short ready interval follows.

During the $t2$ transfer interval, the buffer register 30 receives the STORE microprogram word from the output of the readonly memory 37. There are no branching (UBF) signals, so the UPF' address signals pass through the OR gate array 36 without modification to identify location 004 in the read-only memory 37. This location contains an INC PC microprogram word.

During the $t3$ ready interval the buffer register 30 contains the STORE microprogram word, and the address in the buffer register 30 is for the location containing the INC PC microprogram word. Thus, the read-only memory 37 retrieves the INC PC word.

With this machine state established, the clocking pulse at the $t4$ transfer interval moves the instruction from the bus 11 through the data multiplexer 25 to the REGISTER 12 in the unit 16, the instruction register 27 and the B register 24 to thereby store the machine instruction in all three locations simultaneously.

As apparent, some of the subsequent machine operations depend upon the nature of the retrieved instruction. Hence, the decoding of the instruction sets up various branching operations. In accordance with this invention, however, the STORE microprogram word addresses the INC PC word which the buffer register 30 receives during the $t4$ transfer interval. The INC PC word advances the program counter to identify the next machine instruction in sequence. The program counter must always be advanced. The INC PC word addresses a REST PC word to move the new or advanced program count to REGISTER 7 (the program counter) in the unit 16. It also establishes, through the contents of the UBF bit positions, the nature of a branch.

Thus, during the $t5$ ready interval, the INC PC word enables a data path for transferring the contents of the program counter (REGISTER 7) to the arithmetic and logic unit 20. At the same time the INC PC word addresses the REST PC word, and the read-only memory 37 word retrieves the REST PC word.

Also during the $t5$ ready interval, the system, through the instruction register 27 in FIG. 2 and instruction register decoding logic 29 in FIG. 1, applies control signals representing the operation defined by the machine instruction to the microbranch encoder 33. At the same time various flags in the flag control 34 are set to produce other input signals for the microbranch encoder 33. At the end of the $t5$ ready interval, the microbranch encoder 33 has stabilized so the microbranch multiplexer 35 can respond to the contents of the UBF field in the INC PC word to select a particular set of modification signals from the microbranch encoder 33. These signals are at one set of inputs to the OR gate array 36. The address field (i.e., the UPF' signals) in the REST PC word (i.e., the value 100) is the other set of inputs at the end of the $t5$ ready interval.

When the basic machine timing circuit 32 generates a pulse to define the $t6$ transfer interval, the program count is incremented. As shown in FIG. 2, this data transfers from REGISTER 7 to the A input of the arithmetic and logic unit 20. At the same time the value of "+2" is selected from the constants table 23 and routed through the B multiplexer 22 to the B input of the arithmetic and logic unit 20. The sum of the two numbers at the A and B inputs is loaded into data register 26 as the incremented program count.

Simultaneously, the logical OR combination of the address portion of the REST PC word and the output from the multiplexer 35 is loaded to the buffer register 30. Thus, the buffer register 30 receives a modified address and retrieves the INST 1 microprogram word during the $t7$ ready interval. During the same interval, the buffer register 30 contains the REST PC microprogram word. At the end of the $t7$ ready interval, the first word after the branch (i.e., INST 1 word is available from the read-only memory 37 and the contents of the buffer register 30 have enabled a data path for transferring the output of the data register 26 through the data multiplexer 25 back to REGISTER 7 in the register memory unit 16). This transfer occurs during the subsequent $t8$ transfer interval. Simultaneously, the INST 1 word is loaded into the microprogram word buffer register 30. The INST 1 word likewise contains the address for the next word in sequence.

Thus, in accordance with this invention the system has branched and selected one of a number of possible microprogram words. A microprogram word such as the INC PC word contains the address for a "next" instruction, such as the REST PC word, in sequence. This is an intermediate word which contains a base address, which the branching circuits modify so the "next next" microprogram word comes from one of several locations depending upon the branching conditions. The branching signals stabilize during the $t5$ and $t6$ intervals, so the branch occurs without operational delays.

Usually, it is relatively easy to transfer a microprogram word position so it operates during the stabilizing interval. For example, a logical sequence would include, in order, the steps of (1) retrieving an instruction, (2) incrementing the program counter, (3) restoring the program counter, and then (4) storing and decoding the instruction to effect a branch. However, by transposing step 4 to follow step 2, the system operates without delay.

As will be apparent, this invention has been disclosed with particular reference to a specific data processing system, and has been limited to a specific example of a machine cycle. The invention, however, has application in any microprogram controlled data processing system and it can be implemented in other machine cycles, in fact whenever a branch is necessary. Therefore, it is the intent of the appended claims to cover all such variations and modifications as come within the true spirit and scope of this invention.

What is claimed as new and desired to be secured by Letters Patent of the United States is:

1. A microprogram configured central processor comprising:

A. a read-only memory for storing microprogram words, each microprogram word having a control portion and an address portion for at least partly identifying the next word to be retrieved in sequence, at least one of the microprogram words being a branching word, B. a modifier circuit receiving the address portion of each microprogram word retrieved from memory and for modifying that address in response to certain conditions, C. a buffer register for storing each microprogram word to be executed in sequence, said buffer register being connected for receiving directly the control portion of a microprogram word from said memory, said read-only memory including means for retrieving a next word thereupon in response to the address portion in said buffer register.

D. timing means for defining alternate ready and transfer intervals, said modifier circuit being enabled during a ready interval and producing a modified address for transfer to said buffer register during a subsequent transfer interval.

2. A microprogram configured central processor as recited in claim 1, wherein said modifier circuit comprises a microbranch encoding means for receiving a plurality of control signals and generating an address modifier in response thereto.

3. A microprogram configured central processor as recited in claim 2 wherein said modifier circuit additionally includes means for generating a plurality of condition signals representing internal processor conditions, said microbranch encoding means being additionally responsive to the condition signals.

4. A microprogram configured central processor as recited in claim 3 wherein said microbranch encoding means is adapted for generating a plurality of sets of address modifications signals, said modifier circuit additionally comprising a microbranch multiplexer for selectively coupling one set of modifying signals therethrough, the selection being dependent upon the contents of a branching field in the control portion of the microprogram word contained in said buffer register, and means for combining the address from said read-only memory and said selected set of modifying signals for generating the modified address.

5. A read-only memory for use in a microprogram controlled digital computer including means for generating address signals to obtain words from said memory in sequence, said memory including a plurality of locations for storing microprogram words, each microprogram word comprising a control portion and an address portion, certain of said locations storing branch microprogram words for establishing branches, each branch microprogram word including in the address portion, an address of a next location in the memory, the contents of the next location being a microprogram word with a base address in the address portion thereof for modification in accordance with the control portion of the branch microprogram word, the modified address being the the location of a first microprogram in the branch.

* * * * *